United States Patent
Fox et al.

(10) Patent No.: US 10,762,154 B2
(45) Date of Patent: Sep. 1, 2020

(54) RELATIVE WEIGHTING FOR SOCIAL COLLABORATION COMMENTS

(71) Applicant: INTERNATIONAL BUSINESS MACHINES CORPORATION, Armonk, NY (US)

(72) Inventors: Jeremy R. Fox, Georgetown, TX (US); Liam S. Harpur, Dublin (IE); Trudy L. Hewitt, Cary, NC (US); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/100,653

(22) Filed: Aug. 10, 2018

(65) Prior Publication Data
US 2020/0050705 A1    Feb. 13, 2020

(51) Int. Cl.
| | |
|---|---|
| G06F 16/00 | (2019.01) |
| G06F 16/9535 | (2019.01) |
| G06N 3/02 | (2006.01) |
| G06F 16/31 | (2019.01) |
| G06F 40/20 | (2020.01) |
| G06Q 50/00 | (2012.01) |

(52) U.S. Cl.
CPC ........ *G06F 16/9535* (2019.01); *G06F 16/313* (2019.01); *G06F 40/20* (2020.01); *G06N 3/02* (2013.01); *G06Q 50/01* (2013.01)

(58) Field of Classification Search
CPC .................. G06F 40/35; G06F 40/40
See application file for complete search history.

(56) References Cited

U.S. PATENT DOCUMENTS

| | | | |
|---|---|---|---|
| 9,336,268 B1* | 5/2016 | Moudy | G06F 40/30 |
| 9,686,217 B2 | 6/2017 | Prabhu | |
| 9,830,475 B2 | 11/2017 | Khandelwal | |
| 2012/0272160 A1 | 10/2012 | Spivack et al. | |
| 2013/0097176 A1 | 4/2013 | Khader et al. | |
| 2015/0066950 A1* | 3/2015 | Tobe | G06Q 50/01 |
| | | | 707/748 |
| 2017/0206612 A1 | 7/2017 | Benavides et al. | |
| 2018/0004718 A1* | 1/2018 | Pappu | G06F 16/9535 |
| 2018/0049009 A1 | 2/2018 | Bamess et al. | |
| 2018/0121043 A1* | 5/2018 | Chowdhury | G06F 40/258 |

OTHER PUBLICATIONS

Mell et al., "The NIST Definition of Cloud Computing", National Institute of Standards and Technology, Special Publication 800-145, Sep. 2011, pp. 1-7.

* cited by examiner

*Primary Examiner* — Daniel Abebe
(74) *Attorney, Agent, or Firm* — Kristofer L. Haggerty

(57) ABSTRACT

Embodiments of the present invention disclose a method, a computer program product, and a computer system for proactive comment evaluation. In embodiments, the invention includes detecting a comment being added to a thread and extracting data relevant to the thread. In addition, the invention includes identifying an average sentiment range of the thread based on the extracted data and a model, as well as identifying a sentiment of the comment. Moreover, the invention involves determining whether the identified sentiment is outside the identified average sentiment range and, based on determining that the identified sentiment is outside the average sentiment range, recommending an alternative comment.

17 Claims, 5 Drawing Sheets

RELATIVE WEIGHTING FOR SOCIAL COLLABORATION COMMENTS

BACKGROUND

The present invention relates generally to social media collaboration and, more particularly, to proactive comment evaluation.

It is common for a social media post to have several, dozens, or even hundreds of comments within a social media thread. While the social media platform may highlight one or more most recent or most popular reply comments, the volume of comments may prevent a user from evaluating all existing comments, likes, dislikes, etc. to ascertain a general sentiment of the social media post. Moreover, subsequent comments may unknowingly devalue a previously made comment or the original post itself. For example, a comment stating "that's nice" may be overshadowed by a later comment exclaiming "that's stunning!" In other situations, comments to an original post may unknowingly demean or bully the original post or a comment made by another user.

SUMMARY

Embodiments of the present invention disclose a method, a computer program product, and a computer system for a proactive comment evaluator. In embodiments, the invention includes detecting a comment being added to a thread and extracting data relevant to the thread. In addition, the invention includes identifying an average sentiment range of the thread based on the extracted data and a model, as well as identifying a sentiment of the comment. Moreover, the invention involves determining whether the identified sentiment is outside the identified average sentiment range and, based on determining that the identified sentiment is outside the average sentiment range, recommending an alternative comment.

In embodiments of the present invention, the model is derived based on identifying one or more features within one or more threads, identifying a sentiment of each of the one or more threads, and calculating a corresponding weight for each of the one or more features indicative of an effect the one or more features have on the identified sentiment of each of the one or more threads.

Moreover, according to some embodiments, determining whether the identified sentiment is outside the identified average sentiment range further comprises identifying at least one feature of the one or more features within the comment, applying the corresponding weight to the at least one feature based on the model, and comparing the at least one weighted feature to the average sentiment range.

Furthermore, in some embodiments, the invention includes prompting a user selection to publish at least one of the comment and the alternative comment and the computer training the model based on the user selection.

According to some illustrative aspects of the present invention, extracting data relevant to the thread further comprises the computer identifying a topic of the thread and the computer extracting data relevant to the identified topic. Moreover, extracting data relevant to the thread further comprises identifying one or more users participating in the thread and extracting data relevant to the identified one or more users.

In embodiments, recommending the alternative comment further comprises displaying a spectrum indicating with a slider toggle how the comment scores compared to the average sentiment range, receiving a user input moving the slider toggle along the spectrum, and providing the alternative comment based on the position of the slider toggle.

In accordance with some embodiments of the present invention, identifying the sentiment of the comment further comprises performing at least one of sentiment analysis, keyword searching, named entity recognition, part of speech analysis, syntactic analysis, and semantic analysis.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is focused on the distinctive features or elements of various embodiments of the present invention.

The present invention proactively identifies potentially devaluing, demeaning, belittling, or bullying comments and notifies the user prior to posting the comment. In addition, the present invention suggests an alternative reply comment to that which was identified as potentially devaluing, demeaning, belittling, or bullying.

Figure 1:
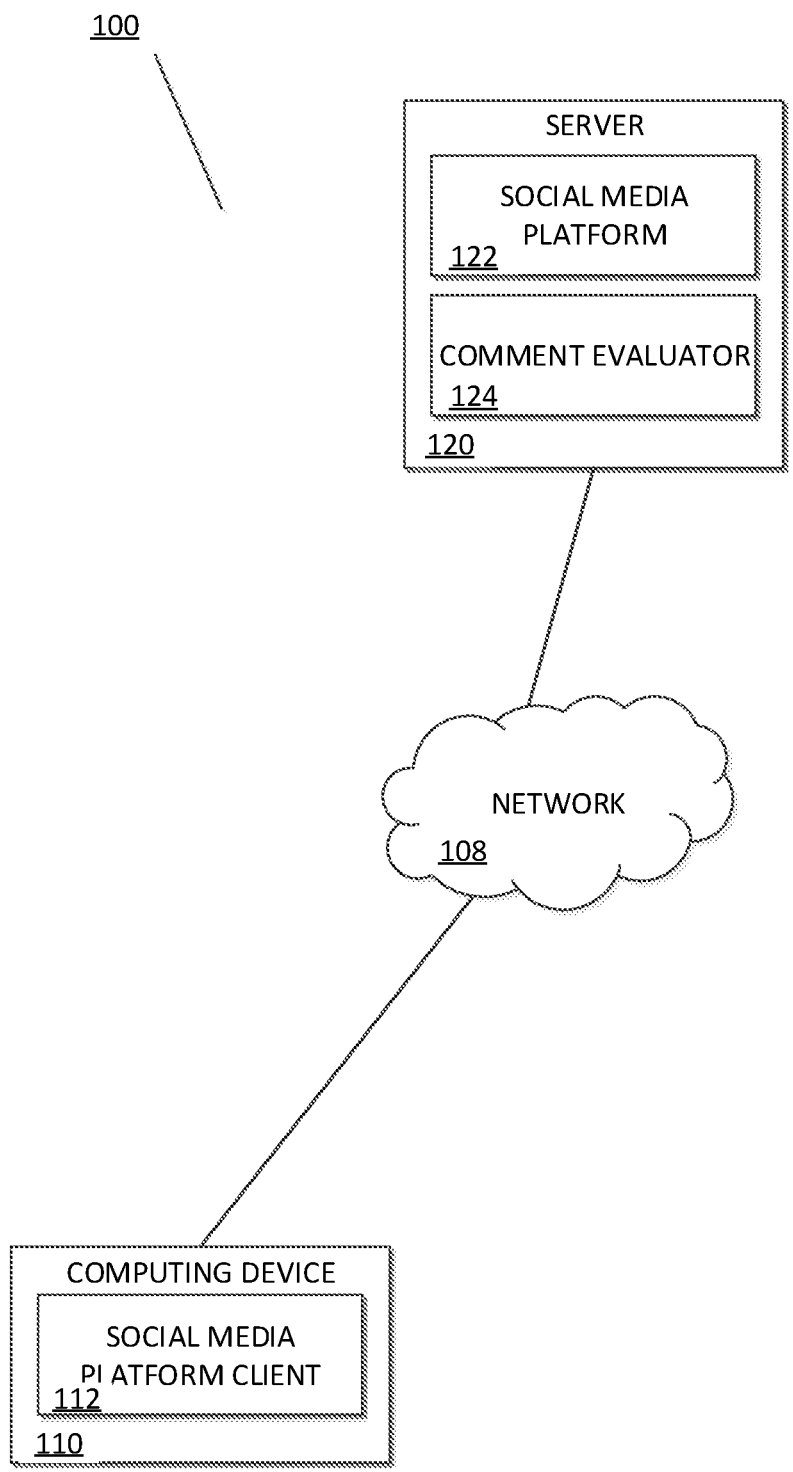
FIG. 1 depicts a schematic diagram of a comment evaluator system 100, in accordance with an embodiment of the present invention.

FIG. 1 depicts a comment evaluator system 100, in accordance with embodiments of the present invention. In the example embodiment, the comment evaluator system 100 includes a computing device 110 and a server 120, interconnected via a network 108. While, in the example embodiment, programming and data of the present invention are stored and accessed remotely across several servers via the network 108, in other embodiments, programming and data of the present invention may be stored locally on as few as one physical computing device or amongst other computing devices than those depicted.

In the example embodiment, the network 108 is a communication channel capable of transferring data between connected devices. In the example embodiment, the network 108 is the Internet, representing a worldwide collection of networks and gateways to support communications between devices connected to the Internet. Moreover, the network 108 may include, for example, wired, wireless, or fiber optic connections which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 can be any combination of connections and protocols that will support communications between the computing device 110 and the server 120.

In the example embodiment, the computing device 110 includes a social media platform client 112 and may be a server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While, in the example embodiment, the computing device 110 is shown as a single device, in other embodiments, the computing device 110 may be comprised of a cluster or plurality of computing devices, working together or working separately. In various embodiments, the comment evaluator system 100 may include one or more of the computing device 110, wherein a user of one of the computing device 110 may first post an original comment on the social media platform 122, making them an original poster, and one or more following users may utilize one or more of the computing device 110 to reply to or otherwise act upon the original comment, making them a following user and creating a thread. In such embodiments, the one or more of the computing device 110 may be collectively referred to hereinafter as the user computing devices. The user computing devices are described in greater detail with reference to FIG. 3.

In the example embodiment, the social media platform client 112 is an application program having a client-server relationship with the social media platform 122 that is capable of transferring information, and more specifically social media information, with the social media platform 122 and other computing devices connected via the network 108. In embodiments, the social media platform client 112 may be connectively coupled to hardware components, such as those depicted by FIG. 3 and including mice, keyboards, touchscreens, microphones, cameras, etc., in order to receive user input that enables interaction with the social media platform 122. Moreover, the social media platform client 112 may be capable of transferring data files, folders, audio, video, hyperlinks, compressed data, and other forms of data transfer individually or in bulk. In other embodiments, social media platform client 112 may be implemented via other standalone software applications or fully/partially integrated with other software applications. In yet further embodiments, the social media platform client 112 may be implemented alternatively, for example navigating to a web address via a web browser.

In the example embodiment, the server 120 includes a social media platform 122 as well as a comment evaluator 124, and may be a server, a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client or any other electronic device or computing system capable of receiving and sending data to and from other computing devices. While the server 120 is shown as a single device, in other embodiments, the server 120 may be comprised of a cluster or plurality of computer devices, working together or working separately. The server 120 is described in greater detail with reference to FIG. 3.

Social media platform 122 is a software program that supports communications between one or more users of the social media platform 122 via the user computing devices and the network 108. In the example embodiment, the social media platform 122 is a collection of files including, but not limited to, HTML files, CSS files, XML files, and JavaScript files. In the example embodiment, a user accesses the social media platform 122 by navigating to a website of the social media platform 122 or executing a corresponding standalone application via the social media platform client 112. In further embodiments, however, the social media platform 122 may be accessed via other means. In general, the social media platform 122 is a social collaboration service that allows users to post, comment, share, co-create, discuss, friend another user, follow a friend, etc. In the example embodiment, the social media platform 122 allows a user to post an original post, from which other users including followers and friends may reply with comments to begin a thread of comments. In the example embodiment, comments may be unpublished, i.e., drafted but not posted publicly, or published, i.e., posted and publicly available. Additionally, the social media platform 122 may provide users with additional options to respond to the original post, for example a "like" or "dislike" option that allows the user to express either positive or negative sentiment towards the post or comment. Moreover, a user may "share" a post by re-posting the original comment elsewhere and optionally adding an additional comment. In further embodiments, a user may "tag" a person, place, or thing within a comment, indicating that a post is relevant to that person, place, or thing.

In the example embodiment, the comment evaluator 124 is a software application that is capable of detecting the posting of a social media comment within a social media post thread and identifying the scope of the social media post thread. In addition, the comment evaluator 124 is further capable of collecting data relating to the social media post thread and analysing the tone and sentiment of one or more social media comments within the social media post thread. Furthermore, the comment evaluator 124 is capable of grouping and classifying the comments as well as training a model based on the analysed tone, sentiment, grouping, and classification. What's more, the comment evaluator 124 is capable of applying the trained model to a comment and proactively alerting the commentator of the possible devaluing, demeaning, bullying, etc. of the comments before recommending an alternative comment based on the trained model.

Figure 2:
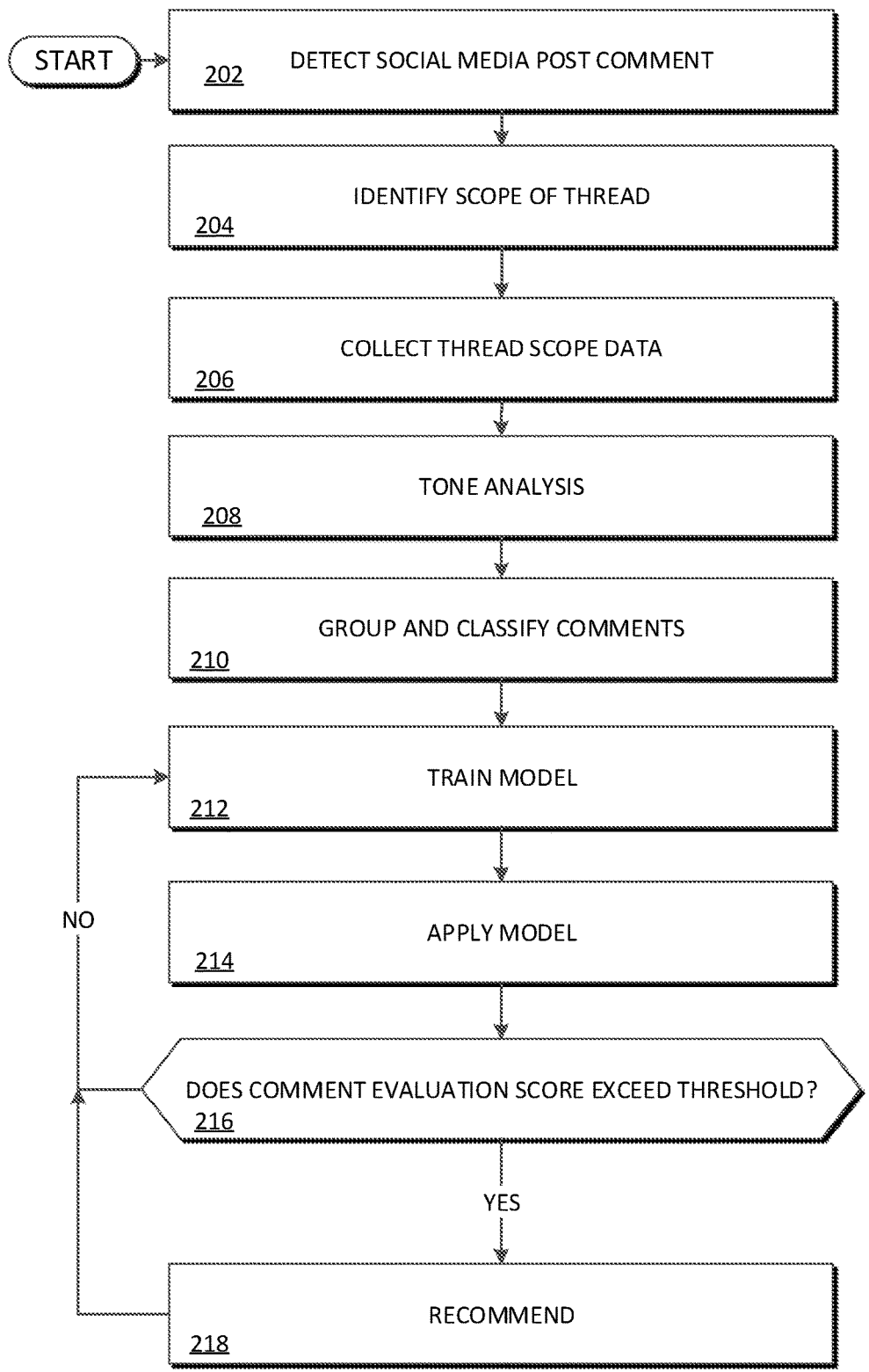
FIG. 2 depicts a flowchart illustrating the operations of a comment evaluator 124 of the comment evaluator system 100 in providing proactive comment evaluation, in accordance with an embodiment of the present invention.

FIG. 2 illustrates the operations of the comment evaluator 124 of the comment evaluator system 100 in proactive comment evaluation.

The comment evaluator 124 detects a comment within a thread posted on the social media platform 122 (step 202). As used herein, a thread is a collection of one or more comments or messages from one or more users that are in response to an original post. In the example embodiment, the comment evaluator 124 preferably detects unpublished comments proactively, for example while a user is drafting the comment in the text field but prior to publishing it, but may also detect comments retroactively after the comment has been published. The comment evaluator 124 detects an unpublished comment by identifying and monitoring the user input fields of threads within the social media platform 122. In this embodiment, for example, the comment evaluator 124 may detect typing, deleting, pasting, cutting, dragging text into the field, dragging text out of the field, any change in state, etc. within a text field associated with a reply comment to a thread. In other embodiments, the comment evaluator 124 may additionally or alternatively detect a comment by identifying and monitoring user input means of the user computing devices, such as those depicted by FIG. 3. In yet further embodiments, the comment evaluator 124 may be configured to detect comments via communication with the social media platform 132, such as receiving a notification when a user selects the comment field to enter a comment or selects an option to post/publish the comment.

As an example, the comment evaluator 124 detects user D typing comment D1 "I hear that job is easy, so you should do just fine" to an original post by user A stating that "I am excited to start my new job. Although I am a bit nervous, it will be good to get experience and meet new people." via detecting text that is input into comment fields of the social media platform 132.

The comment evaluator 124 identifies the scope of the thread having the detected comment (step 204). In the example embodiment, the scope includes the general topic, as well as any possible subtopics and relevant topics. In the example embodiment, the comment evaluator 124 identifies one or more topics/subtopics of the thread via topic modeling techniques, however in other embodiments, may identify one or more topics/subtopics using other techniques. In addition, the comment evaluator 124 additionally identifies the users involved within the thread, including users who post, reply, like, dislike, are tagged, etc., via cross-referencing the usernames and hashtags found within the thread with a registry of users of the social media platform 132. When identifying the scope, in addition to identifying a topic/subtopic of the thread and any involved participants, the comment evaluator 124 may further identify alternative threads mentioning the identified topic/subtopic, as well as activity of the involved participants within alternative threads. In further embodiments, identifying the scope may further include identifying demographic and personal information of the involved parties, such as age, gender, location, interests, profession, and other information found in the social media profile of a user.

With reference to the earlier introduced example in which user A posts an original post regarding a new job, the comment evaluator 124 identifies the scope of the thread via a topic modeling approach, which identifies the general topic of a new job and the subtopics such as a first day, colleagues, bosses, work attire, management, etc. In addition, the comment evaluator 124 identifies comment B1 by user B that reads "That is very exciting! Nothing to be nervous about. You are a great person!" and comment C1 by user C stating "You will do great!" Accordingly, the comment evaluator 124 additionally identifies users B and C, as well as the topics/subtopics of business, personality, and performance.

The comment evaluator 124 collects data relating to and within the identified scope of the thread (step 206). In the example embodiment, where the comment evaluator 124 is stored on the server 120 with the social media platform 122, the comment evaluator 124 retrieves the thread data locally from the social media platform 122. In other embodiments, where the comment evaluator 124 is stored remotely, the comment evaluator 124 may retrieve such data remotely via network 108. In addition to general information relating to a topic/subtopic, the comment evaluator 124 ingests data within the identified scope of the thread that includes data from other threads relating to the topic(s)/subtopic(s) of the thread/original post, the comments and subject matter of the comments within the thread, the date/time of each comment, the length of the post, authors of the original post/comments, and the like. Further, the comment evaluator 124 extracts profile information corresponding to any thread participants, including profile information of users who comment, like, dislike, etc. Such profile information may include user roles, jobs, demographic information, like/interests, dislikes, comments posted in other threads, and the like. In general, the comment evaluator 124 may take into account any information available to it in extracting data related to the thread and participants thereof.

Continuing the example above, the comment evaluator 124 extracts data relating to the topics/subtopics of business, personality, and performance, as well as data relating to users B and C. Such data includes that user B is a thirty-eight year old, male data scientist and user C is a twenty-four year old, female test engineer.

The comment evaluator 124 analyses a tone of the comments within the identified scope (step 208). In the example embodiment, comments within the scope include those within the current thread, such as the original post and comments in response to the original post, as well as related activity within other threads, such as comments relating to the topic/subtopic and comments made by involved participants in alternative threads. In other embodiments, the scope may include more or less comments for tone analyses and can be filtered based on various criteria, for example including only those comments within the current thread, only those comments made by a particular user/users, only those comments made by users with a particular job role, only comments within a certain time period (e.g., most recent), etc. In the example embodiment, the comment evaluator 124 utilizes various natural language processing techniques to identify a tone of each of the comments posted within the identified thread. For example, the comment evaluator 124 utilizes a tone analyser to survey the individual emotions that contribute to the tone of a comment. In the example embodiment, the comment evaluator 124 detects emotions such as joy, fear, sadness, anger, analytics, confidence, tentativeness, ecstasy, admiration, joy, serenity, love, admiration, trust, acceptance, submission, terror, fear, apprehension, awe, amazement, surprise, distraction, disapproval, grief, sadness, pensiveness, remorse, loathing, disgust, boredom, contempt, rage, anger, annoyance, aggressiveness, vigilance, anticipation, interest, optimism, etc. Such analyses may include identifying keywords within the comments, for example identifying keywords indicative of the emotions enumerated above, and may further include associating the keywords with varying strengths or severities. For example, the comment evaluator 124 may associated the emotion anger with the keyword upset for less severe anger and furious for more severe anger, thereby forming a spectrum of the emotion anger. Similarly, the emotion joy may be associated with the keyword happy for less severe joy, and ecstasy for extreme joy, thereby forming a spectrum of relative joy. In addition to identifying keywords within the comments, the comment evaluator 124 may further apply named entity recognition as well as parts of speech, syntactic, and semantic analysis in order to analyse the tones of the comments within the thread and, ultimately, an overall comment and overall thread sentiment. Utilizing the aforementioned techniques, the comment evaluator 124 analyses the tone of each of the comments, as well as the original post, within the determined scope and assigns tonal scores to all emotions identified in each of the comments.

In furthering the previous example, the comment evaluator 124 analyses a tone of each comment within the thread scope via tonal analysis. For example, the comment evaluator 124 analyses comment B1 ("That is very exciting! Nothing to be nervous about. You are a great person!") using natural language processing techniques to deduce tonal scores for each emotion as illustrated by Table 1, below:

TABLE 1

Tonal Scores - Comment B1

| EMOTIONS | SCORE |
|---|---|
| Joy | 0.65 |
| Anger | 0.01 |
| Disgust | 0.01 |
| Sadness | 0.02 |
| Fear | 0.20 |
| ... | ... |

In this example, the tonal scores of comment C1 are omitted for brevity, however computed in a similar manner as comment B1, above.

The comment evaluator 124 classifies and groups the analysed comments (step 210). In addition to identifying tonal scores corresponding to each comment, the comment evaluator 124 similarly identifies an overall comment sentiment score, as well as an overall thread sentiment score based on the overall comment sentiment scores. In embodiments, the comment evaluator 124 may determine the overall comment sentiment score based on a tonal analysis similar to that above. In other embodiments, the comment evaluator 124 may base the overall comment sentiment score on a particular combination of the emotions and corresponding tonal scores identified above, for example negativity may be associated with the emotions sadness, anger, and jealousy, and therefore the comment evaluator 124 may be configured to identify comments as negative when a particular combination of emotions are involved and/or are present beyond a particular threshold. In addition to identifying the tones/emotions comprising a sentiment, the comment evaluator 124 may be further evaluated to manipulate the tonal scores in accordance with a model and compare the outcome to a scale indicative of sentiment. In the example embodiment, the comment evaluator 124 derives an overall comment sentiment score in terms of positivity, for example establishing a range varying in sentiment from negative to neutral to positive sentiment. Moreover, the range may be delineated using various thresholds, including those that separate varying severities of said sentiments. In addition to determining an overall comment sentiment score in terms of positivity, the comment evaluator 124 may additionally generate overall comment sentiment scores for other demeanours, for example a range defining a scale indicative of belittling, demeaning, bullying, or other potentially problematic behaviour in a similar manner. The comment evaluator 124 then analyses and combines the overall comment sentiment scores for all comments within the thread to deduce an overall thread sentiment in a manner similar to computing the overall comment sentiment score above.

In furthering the previous example, the comment evaluator 124 analyses comment B1 ("That is very exciting! Nothing to be nervous about. You are a great person!") to calculate an overall comment sentiment score of the comment B1 as 0.82. Similarly, the comment evaluator 124 computes an overall comment sentiment score for comment C1 ("You will do great!") as 0.68 and, lastly, an overall thread sentiment score of 0.55.

The comment evaluator 124 trains a model describing the relationship between features within the extracted thread data and the sentiment of a comment (step 212). Such features may include the topic/subtopic, the length of the comment, time at which the comment was posted, trends in sentiment as they relate to the topic/subtopic, age of the commentator, the role/job title of the commenter, gender of the commentator, etc. In embodiments, the model provides a tool for consolidating and quantifying the analysed tones and sentiments of the various comments within threads, as well as a tool for predicting the sentiment of an unpublished comment. In this embodiment, the model implements linear discriminate analysis via a neural network, training a model that weights the features as coefficients to inputs in order to output a tone/sentiment for a given comment and overall thread. In order to train the model, the comment evaluator 124 uses the tone/sentiment identified above as labelled training outputs from which to calculate coefficients for each of the above features. In further embodiments, the comment evaluator 124 may consider labels manually input by a user. In general, the weights are indicative of the influence of that feature on the overall sentiment, whether it be positivity, bullying, demeaning, etc., which can be consolidated for multiple comments and applied to future comments in order to predict a sentiment of a given comment and an effect thereof when posted in a thread. In embodiments, other techniques may be used to train the model, including but not limited to perceptrons, Hopfield networks, Boltzmann machines, fully connected neural networks, convolutional neural networks, etc.

With reference again to the previous example, the comment evaluator 124 trains the model by calculating coefficients for the following features: the topic/subtopic, the role/job of the commenter, and the age of the commenter. For brevity, only several features are illustrated.

TABLE 2

Training Data

| | Topic/Subtopic (input) | Commenter Role/Job (input) | Commenter Age (input) | Overall Sentiment (output) |
|---|---|---|---|---|
| Comment B | personality | data scientist | 38 | 0.65 |
| Comment C | performance | test engineer | 24 | 0.35 |

The comment evaluator 124 establishes a range of values, or spectrum, from the trained model as well as a high and low bound at which a comment becomes outside the range of the determined average sentiment of the thread (step 212, continued). These bounds represent the thresholds between which most comments fall with respect to overall sentiment, while values outside the bounds may be perceived as too positive, too negative, too bullying, too demeaning, etc. In the example embodiment, the comment evaluator 124 determines thresholds using a normal distribution pattern with standard deviations/variances, however in other embodiments, the comment evaluator 124 may use alternative distributions and statistical methods to determine the thresholds. In addition to establishing ranges of positivity, the comment evaluator 124 may be further configured to establish ranges of other comment sentiments, such as ranges indicating that a comment may be outside the spectrum in terms of belittling, demeaning, bullying, and the like.

In the example enumerated above, for instance, the comment evaluator 124 identifies a spectrum of positivity wherein overall comment sentiment scores greater than 0.66 are considered positive while overall comment sentiment scores under 0.33 are considered negative, with neutral comments scoring in between.

The comment evaluator 124 applies the model (step 214). In the example embodiment, the comment evaluator 124 applies the model upon detection of a social media response, as is discussed with reference to step 202, and more specifically as the comment is entered into the social media platform client 112. In some embodiments, the comment evaluator 124 may apply the model after any change within the text input field, for example addition or deletion of a character. In other embodiments, the comment evaluator 124 may apply the model after a brief pause in entering text, for example half of a second, as an indication that the user has completed typing. In other embodiments, the model may not be applied until an option to post the comment is selected, at which point the comment evaluator 124 delays the posting of the comment until the model is applied. In the example embodiment, the comment evaluator 124 applies the model by first identifying any of the aforementioned factors within the unpublished thread post and then inputting them into the model. The comment evaluator 124 then applies the coefficients and analyses the output with respect to the determined spectrum. Based on where the unpublished comment ranks on the spectrum, the comment evaluator 124 determines an overall sentiment of the unpublished comment.

Furthering the previous example, user D begins to type an unpublished comment D1 that states, "You should be scared. That work place is scary!". Based on detecting the typing of comment D1, the comment evaluator 124 analyses the comment in a similar manner to that above in order to determine an overall comment sentiment score of 0.20.

The comment evaluator 124 determines whether the value calculated for the unpublished comment falls within the established thresholds, or bounds/range, of the spectrum (decision 216). In the example embodiment, the comment evaluator 124 compares the overall comment sentiment score with the spectrum of sentiment ascertained from the scope of the thread.

If the comment evaluator 124 determines the comment is outside the previously determined thresholds of the sentiment spectrum (decision 216 "YES" branch), then the comment evaluator 124 alerts the user that the unpublished comment is outside the range of average positivity, belittling, bullying, etc., and recommends alternative language and/or content for the comment (step 218). In the example embodiment, the comment evaluator 124 alerts the user via pop-up speech bubble that appears next to the comment. In other embodiments, a flag icon may appear, an alert may be sounded, a pop-up window may appear, or the like. In embodiments, a slider toggle and slider bar approach is introduced that displays where the user's unpublished comment falls on the spectrum determined by the model as well as the threshold bounds. In this embodiment, the user has the option to slide the thumb of the slider bar to where the user desires to fall relative to the other comments, whether that be, for example, negative out of range, positive out of range, or within range. In the example embodiment, the comment evaluator 124 analyses the algorithm within the model to determine which factor(s) of the overall sentiment needs to be adjusted in order to place the value of the overall emotion of the unpublished comment where the user has indicated on the slider bar. In order to suggest alternative comment content, the comment evaluator 124 identifies what word or portion of the comment is causing the comment to fall outside the range. Once identified, the comment evaluator 124 identifies a replacement keyword or group of words having the same emotion but with more or less severity based on how the comment exceeded the bounds and suggests it back to the user.

In furthering the example above, because the comment evaluator 124 determines that the overall comment sentiment score of unpublished comment D1 of 0.20 is out of range, the comment evaluator 124 alerts user D that comment D1 is much less positive than the average post within the thread is. The comment evaluator 124 then suggests "I hear that job can be challenging".

If the comment evaluator 124 determines the comment is not outside the range of the spectrum (decision 216 "NO" branch), the unpublished comment is posted and is analysed similar to above in order to further train the model (step 212). In embodiments, the comment evaluator 124 may alternatively resume detecting a social media comment (step 202).

Figure 3:
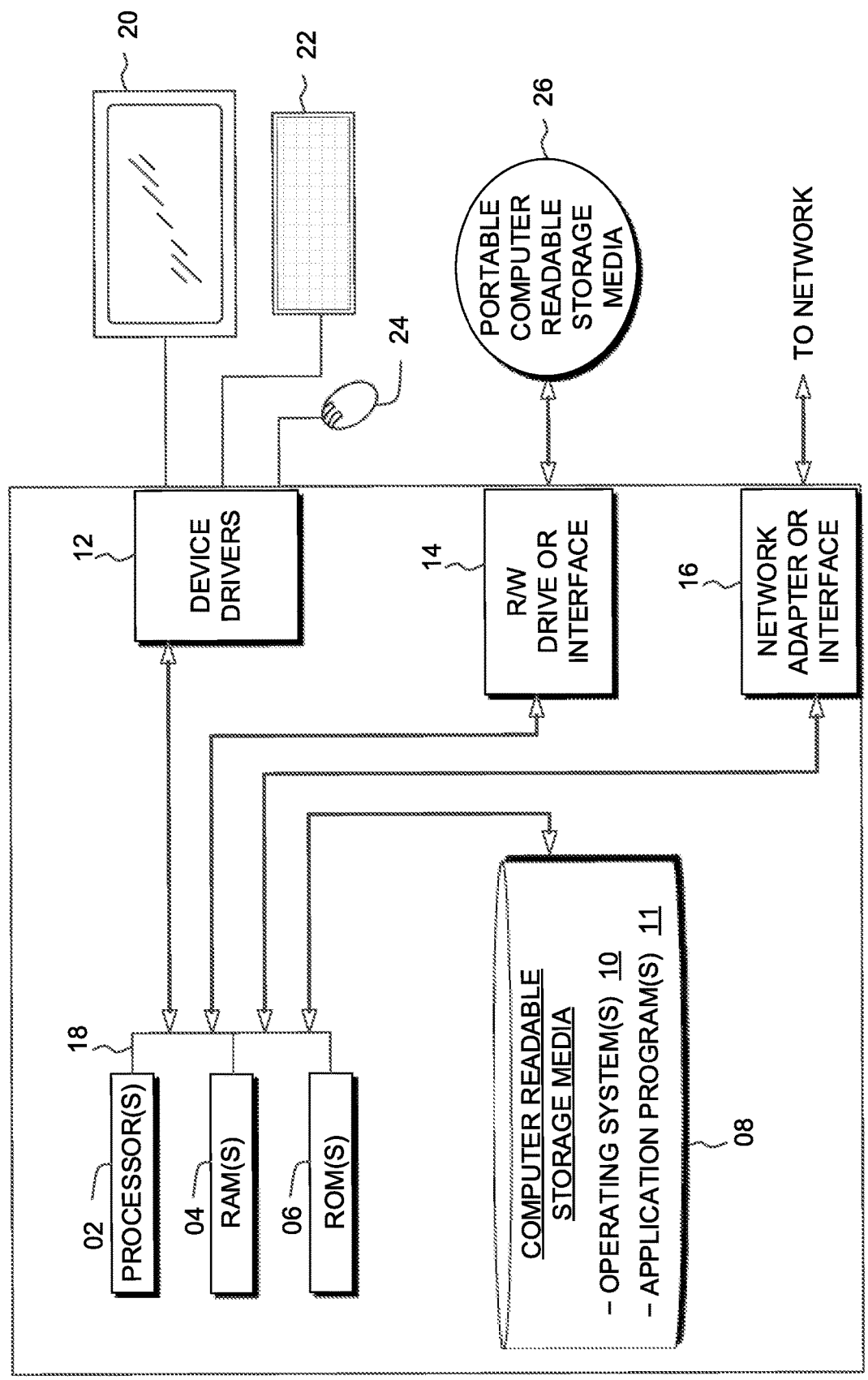
FIG. 3 depicts a block diagram depicting the hardware components of the comment evaluator system 100 of FIG. 1, in accordance with an embodiment of the present invention.

FIG. 3 depicts a block diagram of the computing device 110 and server 120 of the comment evaluator system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
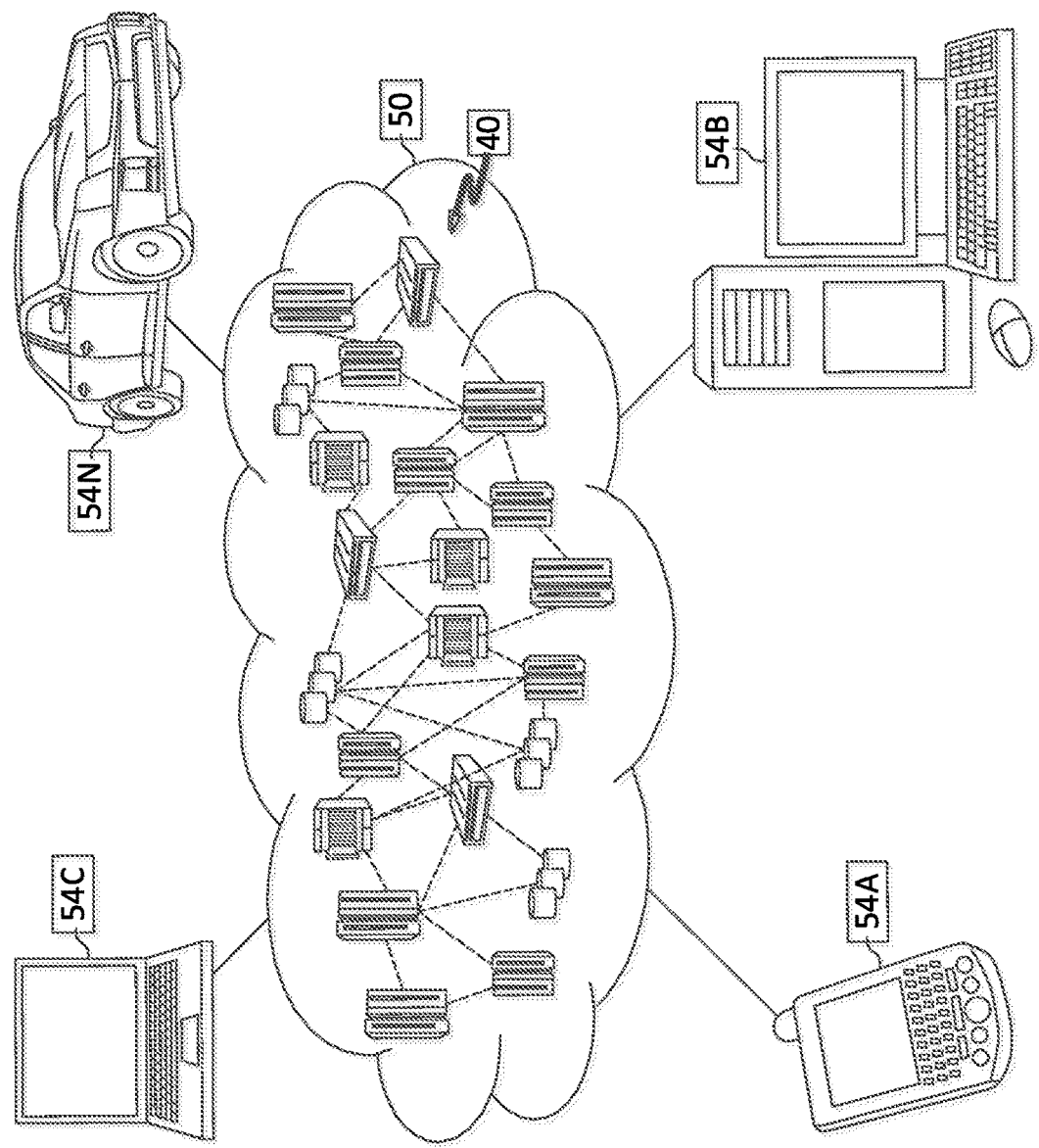
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
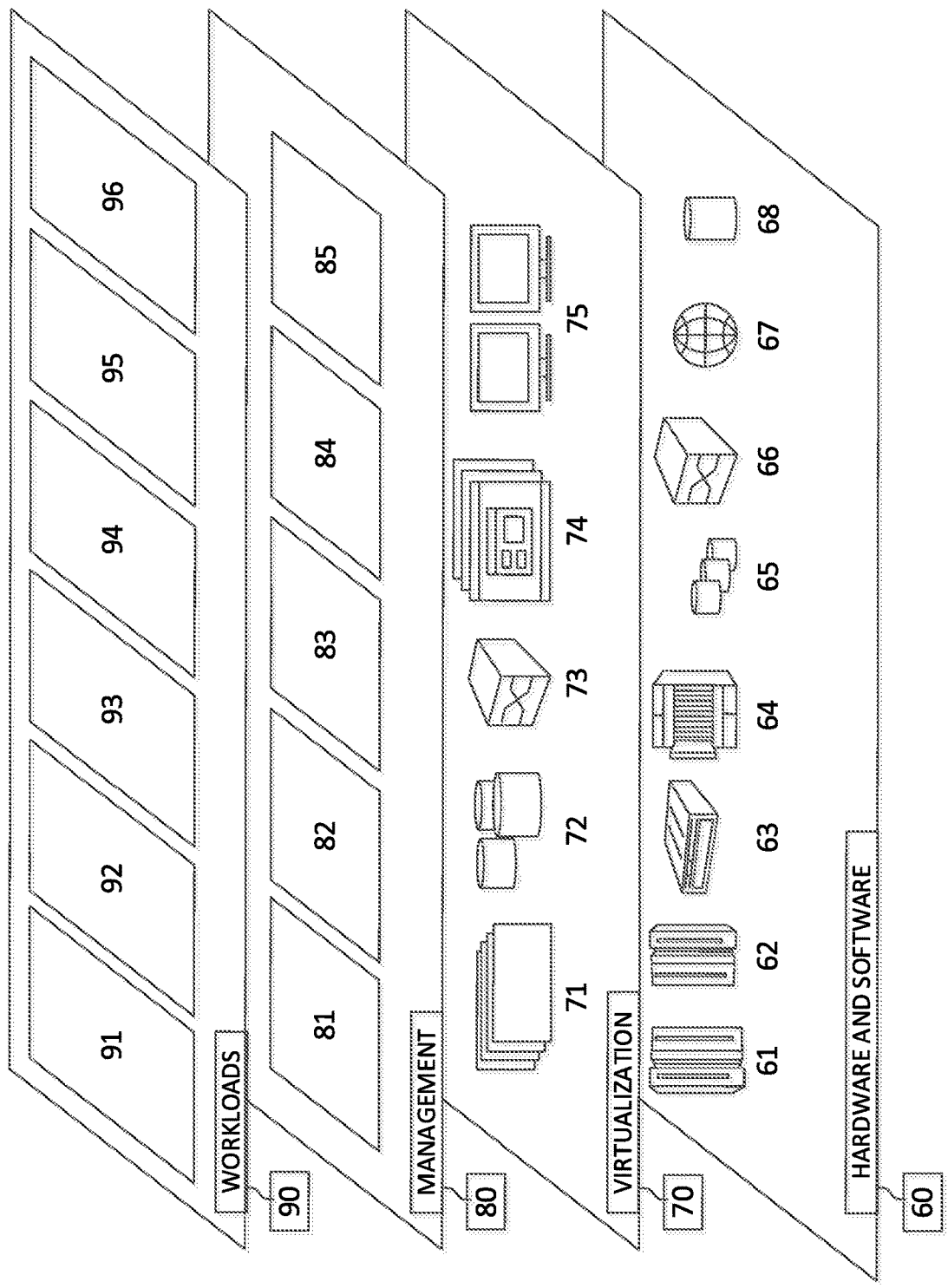
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and comment evaluator 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for proactive comment evaluation, the method comprising;
   a computer detecting a comment being added to a thread;
   the computer extracting data relevant to the thread by:
      identifying a topic of the thread;
      extracting data relevant to the identified topic;
      identifying one or more users participating in the thread; and
      extracting data relevant to the identified one or more users;
   the computer identifying an average sentiment range of the thread based on the extracted data and a model;
   the computer identifying a sentiment of the comment;
   the computer determining whether the identified sentiment is outside the identified average sentiment range; and
   based on determining that the identified sentiment is outside the average sentiment range, the computer recommending an alternative comment.

2. The method of claim 1, wherein the model is derived based on:
   the computer identifying one or more features within one or more threads;
   the computer identifying a sentiment of each of the one or more threads; and
   the computer calculating a corresponding weight for each of the one or more features indicative of an effect the one or more features have on the identified sentiment of each of the one or more threads.

3. The method of claim 2, wherein determining whether the identified sentiment is outside the identified average sentiment range further comprises:
   the computer identifying at least one feature of the one or more features within the comment;
   the computer applying the corresponding weight to the at least one feature based on the model; and
   the computer comparing the at least one weighted feature to the average sentiment range.

4. The method of claim 1, further comprising:
   the computer prompting a user selection to publish at least one of the comment and the alternative comment; and the computer training the model based on the user selection.

5. The method of claim 1, wherein recommending the alternative comment further comprises:
the computer displaying a spectrum indicating with a slider toggle how the comment scores compared to the average sentiment range;
the computer receiving a user input moving the slider toggle along the spectrum; and
the computer providing the alternative comment based on the position of the slider toggle.

6. The method of claim 1, wherein identifying the sentiment of the comment further comprises:
the computer performing at least one of sentiment analysis, keyword searching, named entity recognition, part of speech analysis, syntactic analysis, and semantic analysis.

7. A computer program product for proactive comment evaluation, the computer program product comprising:
one or more computer-readable storage media and program instructions stored on the one or more computer-readable storage media, the program instructions comprising:
program instructions to detect a comment being added to a thread;
program instructions to extract data relevant to the thread by:
identifying a topic of the thread;
extracting data relevant to the identified topic;
identifying one or more users participating in the thread; and
extracting data relevant to the identified one or more users;
program instructions to identify an average sentiment range of the thread based on the extracted data and a model;
program instructions to identify a sentiment of the comment;
program instructions to determine whether the identified sentiment is outside the identified average sentiment range; and
based on determining that the identified sentiment is outside the average sentiment range, program instructions to recommend an alternative comment.

8. The computer program product of claim 7, wherein the model is derived based on:
program instructions to identify one or more features within one or more threads;
program instructions to identify a sentiment of each of the one or more threads; and
program instructions to calculate a corresponding weight for each of the one or more features indicative of an effect the one or more features have on the identified sentiment of each of the one or more threads.

9. The computer program product of claim 8, wherein the program instructions to determine whether the identified sentiment is outside the identified average sentiment range further comprises:
program instructions to identify at least one feature of the one or more features within the comment;
program instructions to apply the corresponding weight to the at least one feature based on the model; and
program instructions to compare the at least one weighted feature to the average sentiment range.

10. The computer program product of claim 7, further comprising:

program instructions to prompt a user selection to publish at least one of the comment and the alternative comment; and
program instructions to train the model based on the user selection.

11. The computer program product of claim 7, wherein the program instructions to recommend the alternative comment further comprises:
program instructions to display a spectrum indicating with a slider toggle how the comment scores compared to the average sentiment range;
program instructions to receive a user input moving the slider toggle along the spectrum; and
program instructions to provide the alternative comment based on the position of the slider toggle.

12. The computer program product of claim 7, wherein the program instructions to identify the sentiment of the comment further comprises:
program instructions to perform at least one of sentiment analysis, keyword searching, named entity recognition, part of speech analysis, syntactic analysis, and semantic analysis.

13. A computer system for proactive comment evaluation, the computer system comprising:
one or more computer-readable storage media and program instructions stored on the one or more computer-readable storage media, the program instructions comprising:
program instructions to detect a comment being added to a thread;
program instructions to extract data relevant to the thread by:
identifying a topic of the thread;
extracting data relevant to the identified topic;
identifying one or more users participating in the thread; and
extracting data relevant to the identified one or more users;
program instructions to identify an average sentiment range of the thread based on the extracted data and a model;
program instructions to identify a sentiment of the comment;
program instructions to determine whether the identified sentiment is outside the identified average sentiment range; and
based on determining that the identified sentiment is outside the average sentiment range, program instructions to recommend an alternative comment.

14. The computer system of claim 13, wherein the model is derived based on:
program instructions to identify one or more features within one or more threads;
program instructions to identify a sentiment of each of the one or more threads; and
program instructions to calculate a corresponding weight for each of the one or more features indicative of an effect the one or more features have on the identified sentiment of each of the one or more threads.

15. The computer system of claim 14, wherein the program instructions to determine whether the identified sentiment is outside the identified average sentiment range further comprises:
program instructions to identify at least one feature of the one or more features within the comment;
program instructions to apply the corresponding weight to the at least one feature based on the model; and program instructions to compare the at least one weighted feature to the average sentiment range.

16. The computer system of claim 13, further comprising:

program instructions to prompt a user selection to publish at least one of the comment and the alternative comment; and program instructions to train the model based on the user selection.

17. The computer system of claim 13, wherein the program instructions to recommend the alternative comment further comprises:

program instructions to display a spectrum indicating with a slider toggle how the comment scores compared to the average sentiment range;

program instructions to receive a user input moving the slider toggle along the spectrum; and program instructions to provide the alternative comment based on the position of the slider toggle.

* * * * *